Aug. 7, 1956  W. E. WHITE  2,757,640
POWER ACTUATOR FOR BRAKE
Filed Feb. 15, 1949.  2 Sheets-Sheet 2

INVENTOR.
WILLIAM E. WHITE
BY
G. A. Gust
ATTORNEY

United States Patent Office 2,757,640
Patented Aug. 7, 1956

2,757,640

POWER ACTUATOR FOR BRAKE

William E. White, South Bend, Ind., assignor to Bendix Aviation Corporation, South Bend, Ind., a corporation of Delaware Application February 15, 1949, Serial No. 76,517

7 Claims. (Cl. 121—38)

The present invention relates to fluid pressure brake actuators and more particularly to a fluid responsive motor having tandem pistons.

An object of the present invention is to provide an improved brake actuator having a mechanical shoe spreading device and a fluid pressure cylinder combined in a single, or unitary, construction, the parts of which can be directly secured or integrated in the brake assembly.

A further object is to provide an improved brake actuator comprising a tandem piston arrangement which can be directly secured in an unobstructing place in a brake assembly.

A still further object is to provide a fluid brake actuator of tandem design which is less expensive to manufacture than the conventional designs.

Other objects, features and advantages of the present invention will become apparent during the course of the following description, reference being had therein to the accompanying drawings, in which.

Figure 1:
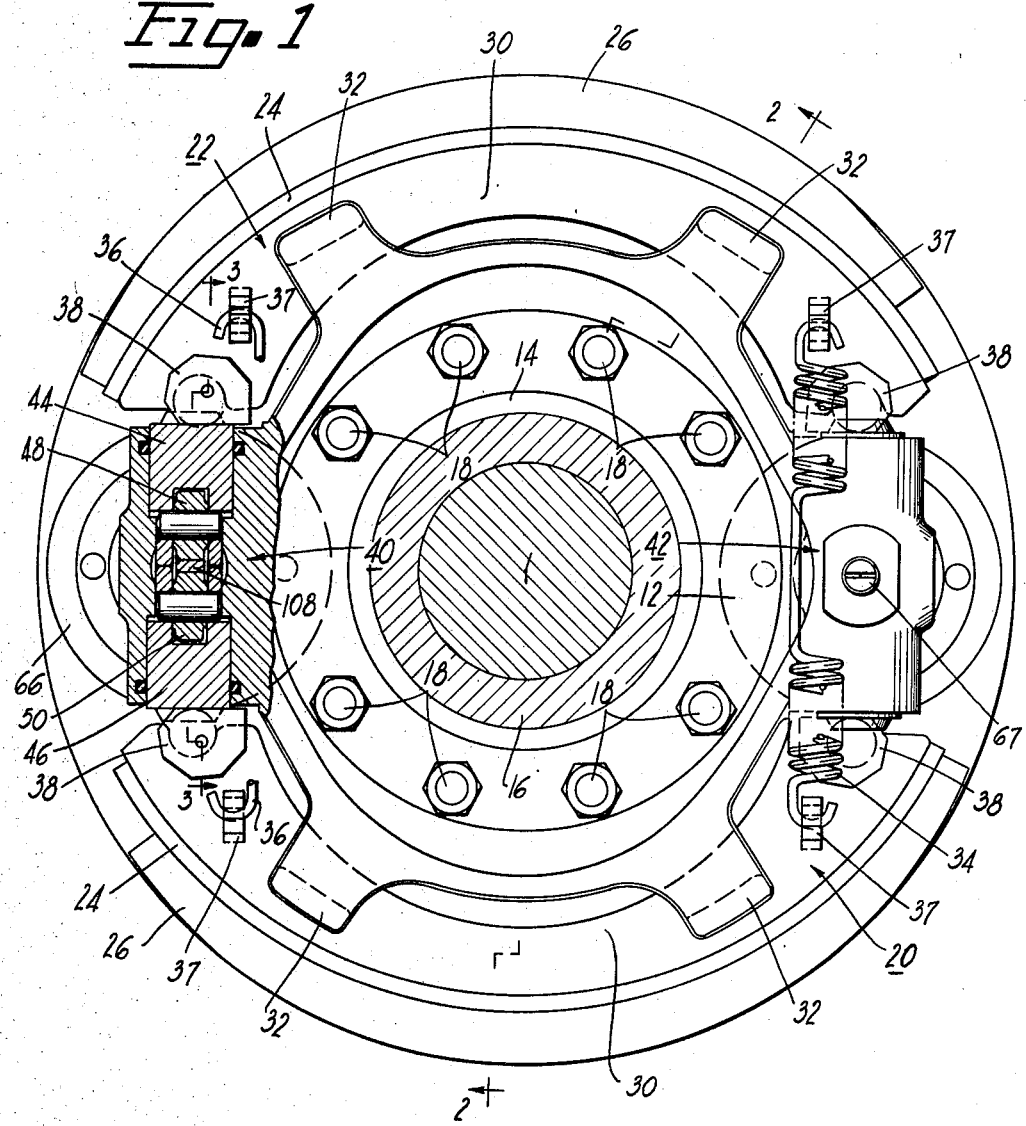
Figure 1 is a side elevation of a brake assembly illustrating an embodiment of the present invention, certain portions being shown in section.
Figure 2:
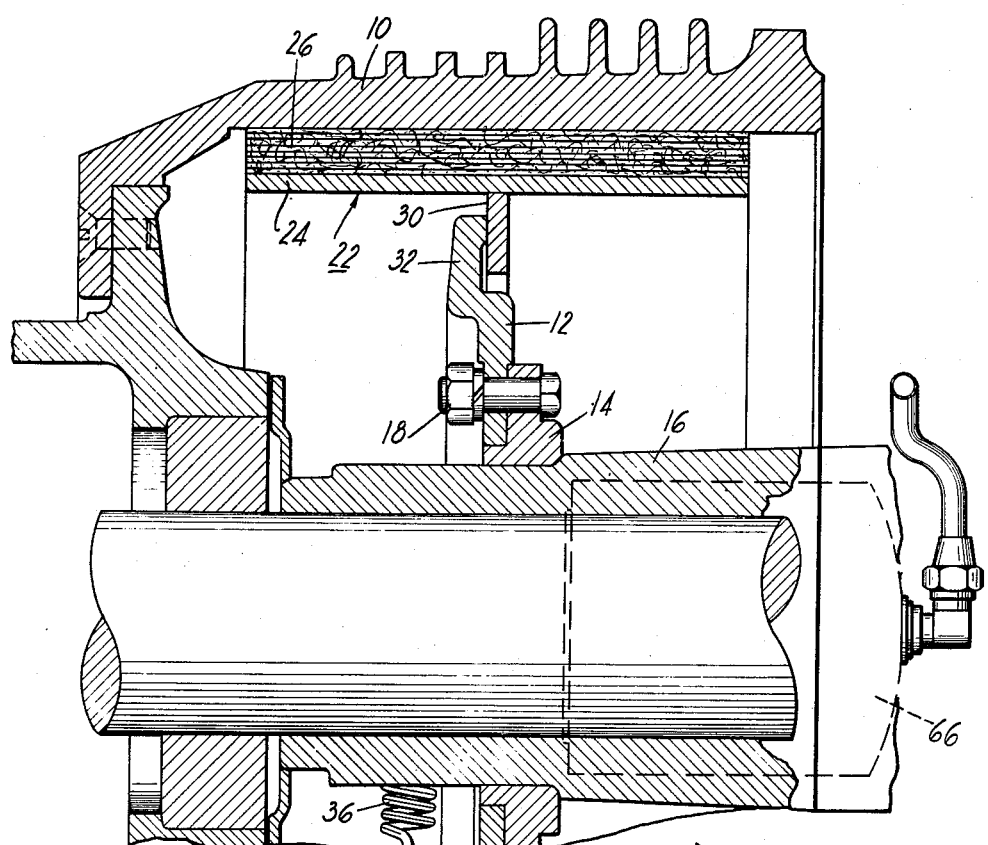
Figure 2 is an axial section thereof taken substantially on Line 2—2 of Figure 1.

Referring to the drawings and more particularly to Figures 1 and 2 thereof, a rotatable brake drum having a cylindrical braking flange 10 is shown journaled about the non-rotatable supporting plate 12 which is secured to flange 14 of axle housing 16 by means of a plurality of bolts 18.

Two T-section brake shoes 20 and 22 are provided, each of which, in the illustrated brake design, is individually shiftable to anchor at either end depending upon the direction of drum rotation at the instant the shoes are moved into engagement with the drum. Each end of each shoe constitutes the "toe," or applied, end of the shoe in one direction of drum rotation, and the "heel," or anchored, end of the shoe in the other direction of drum rotation.

Each of the shoes has a rim portion 24 to which is secured a lining segment 26, and a strengthening web portion 30.

In order to avoid offset loading of the supporting plate 12, the shoes are preferably centralized axially with respect to said supporting plate; i. e. the webs 30 of the shoes are located in the plane of the central flat portion of the support member. This relationship is illustrated in Figure 2.

The shoes 20 and 22 are guided laterally by contact of the shoe webs 30 with surfaces provided on offset radial projections 32 of the support member 12 (as illustrated in Figure 2). In order to retain the shoes in position with the guide projections 32, the return springs 34 and 36, which are hooked to posts 37 to urge the shoes toward retracted position, are offset laterally, or axially, from the plane of the shoe webs in such a manner to urge the webs 30 into engagement with the guide projections 32.

Adjustment of the released position of the brake shoes to compensate for lining wear is preferably provided by a plurality of adjustors 38, having the shapes of irregular polygons.

Although the supporting member 12 may be formed by stamping or forging, the illustrated version of it is a casting to facilitate integrating therewith the casings 40 and 42, thus avoiding the necessity for securing separately formed casings to said support member 12.

The actuating devices or fluid responsive motors which constitute the core of the present invention are of identical construction and are secured on diametrically opposite sides of the brake in such a manner as to clear the rotatable brake drum 10; therefore, the following description of one of the actuating devices is equally applicable to the other.

The mechanical shoe spreading devices are housed in the casings 40 and 42 and comprise, essentially, oppositely reciprocable plungers 44 and 46 each of which carries on its inner end friction reducing roller 48. The outer ends of these plungers are formed with slots 56 to receive therein adjustors 38 which are slotted as at 60, to receive the ends of the webs of the respective brake shoes.

Figure 3:
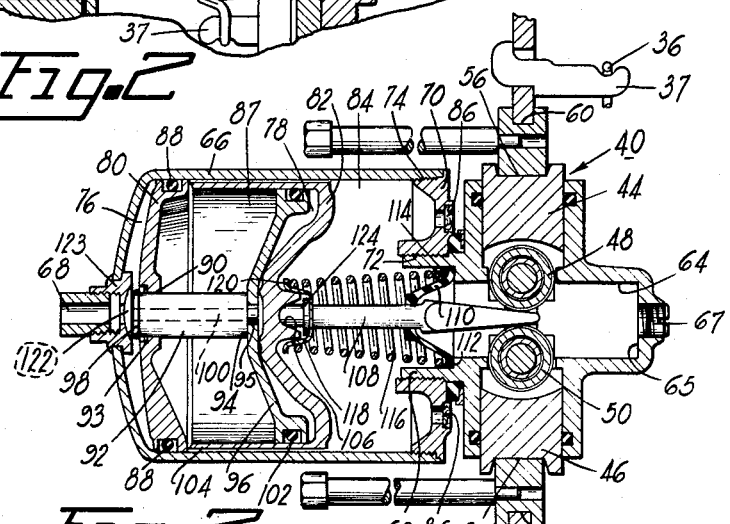
Figure 3 is an axial section of the fluid brake actuator and a fragmental section of a brake assembly connected therewith.

Extending laterally from each casing is a hollow externally threaded boss 62, which is on the same axis as the bore of the lubricating fluid reservoir 64 and forms a continuation of the open end of said bore, the other end of said bore 64 being closed by a wall 65, and a plug 67. The externally threaded boss 62 provides a support for a fluid pressure cylinder 66. This cylinder may be constituted by a cup-shaped stamping which is provided with an inlet port 68, and an annular cover 70 having a centrally threaded perforation or opening 72 which is screwed on the externally threaded boss 62. Cover 70 may be secured to cylinder 66 by any suitable means, and is, preferably, provided with external threads which mate with threaded portion 74 of cylinder 66. This fluid pressure cylinder, or motor, as illustrated in Figure 3, is intended to be actuated by air under super-atmospheric pressure, the air chambers 76 and 78 being connected through port 68 to a source of air under pressure.

Reciprocable in cylinder 66 are two pistons 80 and 82 which are subjected on one side to the pressure prevailing in port 68 and on the other side to substantially atmospheric pressure. For example, chamber 84 is in constant communication with the atmosphere through breather ports 86, while chamber 87 is in communication with chamber 84 by way of clearance provided around the periphery of piston 82. The piston 80 is provided with a suitable annular seal 88 which prevents fluid communication between chamber 76 and chambers 84 and 87. Received through a central perforation 90 in piston 80 is a stem 92 which is secured by any suitable means at its end 94 to a pressure head or chamber cover 96 such as by means of a reduced end portion 95 on stem 92 press fitted into a companion aperture in said cover 96. This central perforation 90 is provided with an annular seal 93 which prevents fluid communication between chambers 76 and 87. On the other end of stem 92 is secured a snap ring 98 which serves the function of limiting accidental forward movement of stem 92 with respect to piston 80. Stem 92 is further provided with an axial passage 100 which serves the purpose of providing fluid communication between chambers 76 and 78. Another annular seal 102 is nested in the outer periphery of head 96 to prevent fluid communication between chambers 87 and 78.

The second piston 82 is preferably provided with an integral thrust sleeve or pressure transmitting member 104 which reciprocably surrounds pressure head 96, and which extends into abutting engagement with piston 80. Piston 82 and its associated thrust sleeve 104 are machined to such size as to be freely reciprocable in cylinder 66 and to allow fluid communication therearound between chambers 84 and 87. As is obvious from an inspection of Figure 3, the effective area of piston 82 exposed to chamber 78 is less than the area of piston 80 exposed to chamber 76. This is due in part to the concentric annular relief formed about the center of piston 82, which engages the pressure head 96 around the end of opening 100 thereby restricting the effective area of piston 82 to that within the confines of this annular relief while said piston 82 is retracted against pressure head 96. Also, the member 104 occupies some space which makes the over-all area of piston 82 less than that of piston 80. With this arrangement of piston areas, piston 80 will always be thrust into engagement with the end of member 104 by the pressure of fluid communicated to the chambers 76, 78. This abutting enggagement prevents piston 80 from tilting and becoming wedged in cylinder 66.

Piston 82 is further provided with a central spherical recess 106 into which is received a mating end of a thrust transmitting member 108 whose axis coincides with the axis of fluid pressure cylinder 66. Thrust transmitting member 108 extends through the central opening in boss 62 and rubber boot 110 which is held in position on shoulder 112 provided on boss 62 by means of a boot retainer ring 114. Thrust transmitting member 108 is further held in position by means of a compression spring 116 confined between the boot retainer ring 114, and the flange 120 of spring retainer 118 preferably fabricated to tightly surround the end of the thrust transmitting member which engages the piston 82 which in turn bears against member 96 to yieldably position the stem 92 on the fitting 123. The outer end of thrust transmitting member is wedge-shaped, to engage the rollers 48 and 50 in such a manner that axial movement of thrust transmitting member towards the brake axis will cause the brake shoes to be spread apart.

In operation, fluid pressure enters port 68 and communicates with chamber 76, passage 100 in stem 92, and chamber 78. The pressure created in chamber 76 will act on piston 80 to cause said piston to move towards the annular wall 70, pushing against the end of thrust sleeve 104. Piston 82 by virtue of the pressure created in chamber 78 will also be forced towards wall 70 and will cause axial outward movement of the thrust transmitting member 108. Thus a tandem piston arrangement whereby pistons of substantially the same diameter are acting as a unitary power unit is provided whereby approximately twice as much force is obtained as when a single piston of the same diameter is used. The pressure head 96 is retained in the illustrated position by means of the fluid pressure in chamber 78, the ends of this chamber being the pressure head 96 and piston 82, piston 82 being the only member of the two capable of moving when fluid pressure is introduced into said chamber 78.

When the fluid pressure is removed, compression spring 116 pushes the tandem piston assembly to the released position illustrated in Figure 3.

To insure fluid communication between port 68 and chamber 78, a radial slot 122 is formed in the end of the fitting 123 adjacent the abutting end of stem 92. A retaining ring 124 may be tightly clamped on member 108 to hold retainer 118 and thus spring 116 in position.

The conventional practice in constructing tandem cylinders is to form the outer shell of a pair of cylindrical sections and to fit them together by any suitable means. The intermediate pressure head is then fitted to the confluence of two sections for the purpose of holding it in place. The present invention eliminates the necessity of constructing the outer shell in this manner by forming it in one piece.

The actuating parts of my tandem cylinder, comprising the pistons and the pressure head, can be assembled as a sub-assembly or unit into the open end of the cylindrical shell. It is obvious, then, that the number of operations necessary for assembling this cylinder is substantially reduced over those necessary for assembling the conventional cylinder.

Although only one embodiment of the invention has been illustrated and described, it will be obvious to those skilled in the art that various changes in the form and rearrangement of the parts may be made without departing from the scope of the invention.

I claim:

1. For use in a brake assembly to actuate the same, a fluid pressure device comprising a cup-shaped cylinder, a pair of unconnected pistons reciprocably movable therein, a thrust sleeve secured to the outer periphery of one of said pistons extending into abutting engagement with the outer peripheral margin of the other of said pistons, a disk-shaped pressure head reciprocably mounted inside said thrust sleeve, a fluid-sealing member carried on the outer periphery of said pressure head, an axially perforated stem having one end received in an aperture in the center of said pressure head in fluid tight relation, the other end of said stem being provided with a snap ring, one of said pistons having a central opening through which is reciprocably received the portion of said stem between said snap ring and said pressure head, a fluid-sealing member carried in the periphery of said central opening, a fluid pressure inlet port provided in the end wall of said cylinder, the end of said stem remote from said pressure head normally being yieldably urged into abutting relation with said end wall with the perforation in said stem registering with said port, a radial slot formed in said end of said wall and communicating with said port, resilient means for urging said pistons toward released position, a spherically shaped recess provided in the center of one of said pistons on the side remote from said pressure head, a closure for the end of said cylinder formed with a threaded central opening, and a thrust transmitting member received in said last-named opening having a wedge on one end and a spherical surface on the other end which engages said spherical recess.

2. For use in a brake assembly to actuate the same, a fluid pressure device comprising a cup-shaped cylinder, a pair of unconnected pistons reciprocably movable therein, a thrust member secured to the outer periphery of one of said pistons extending into abutting engagement with the outer peripheral margin of the other of said pistons, a pressure head reciprocably carried inside said thrust member in fluid-sealing relation therewith, an axially perforated stem having one end received in an aperture in the center of said pressure head in fluid tight relation, one of said pistons having a central opening through which is received said stem in fluid-sealing relation, a fluid pressure inlet port provided in the end wall of said cylinder, the end of said stem remote from said pressure head normally being yieldably urged into abutting relation with said end wall with the perforation in said stem registering with said port, resilient means for urging said pistons toward released position, a spherically shaped recess provided in the center of one of said other pistons on the side remote from said pressure head, a closure for the end of said cylinder formed with a threaded central opening, and a thrust transmitting member received in said last-named opening having a wedge on one end and a spherical surface on the other end which engages said spherical recess.

3. For use in a brake assembly to actuate the same, a fluid pressure device comprising a cylinder, a pair of unconnected self-centering tandem arranged pistons reciprocable in said cylinder, a cylindrical bearing flange extending axially from the outer periphery of one of said pistons and having a length sufficient to prevent this one piston from tilting and binding in said cylinder, the other one of said pistons being in abutting engagement with the end of said bearing flange whereby its thrust may be transmitted through said flange to said one piston, said abutting engagement also preventing said other one of said pistons from tilting and binding in said cylinder, a pressure head carried inside said flange in fluid-sealing relation therewith, and means providing fluid communication for actuating said pistons.

4. For use in a brake assembly to actuate the same, a fluid pressure device comprising a cylinder, a pair of relatively movable pistons reciprocable in said cylinder and adapted to be self-centering therein, a pressure transmitting member carried by one of said pistons which extends into abutting engagement with the other of said pistons, the effective area of said one of said pistons being smaller than the effective area of the other of said pistons whereby said pistons will be urged into abutting relation by the actuating fluid pressures, a pressure head carried inside said member and providing an end wall for a chamber formed between said pressure head and said one piston, means permitting the introduction of fluid pressure through the end wall of said cylinder, and means providing for fluid communication between the chamber formed by said end wall and the adjacent piston and the chamber formed between the other piston and said pressure head.

5. For use in a brake assembly to actuate the same, a fluid pressure device comprising a cylinder, a pair of unconnected self-centering tandem arranged pistons reciprocable in said cylinder, a bearing flange extending axially from the outer periphery of one of said pistons and having a length sufficient to prevent this one piston from tilting and binding in said cylinder, a pressure head mounted inside said bearing flange, the other one of said pistons being in abutting engagement with the end of said bearing flange whereby its thrust may be transmitted through said flange to said one piston, said abutting engagement also preventing said other one of said pistons from tilting and binding in said cylinder, and means providing fluid communication for actuating said pistons.

6. For use in a brake assembly to actuate the same, a fluid pressure device comprising a cup-shaped cylinder, a pair of unconnected pistons reciprocably movable therein, a thrust sleeve secured to the outer periphery of one of said pistons extending into abutting engagement with the outer peripheral margin of the other of said pistons, a disk-shaped pressure head mounted inside said thrust sleeve, a fluid-sealing member carried on the outer periphery of said pressure head, an axially perforated stem having one end received in an aperture in the center of said pressure head in fluid tight relation, the other end of said stem being provided with a snap ring, one of said pistons having a central opening through which is received the portion of said stem between said snap ring and said pressure head, a fluid-sealing member carried in the periphery of said central opening, a fluid pressure inlet port provided in the end wall of said cylinder, the end of said stem remote from said pressure head normally being yieldably urged into abutting relation with said end wall with the perforation in said stem registering with said port, a radial slot formed in said end of said wall and communicating with said port, resilient means for urging said pistons toward released position, a spherically shaped recess provided in the center of one of said pistons on the side remote from said pressure head, and a closure for the end of said cylinder formed with a threaded central opening.

7. For use in a brake assembly to actuate the same, a fluid pressure device comprising a cup-shaped cylinder, a pair of unconnected pistons reciprocably movable therein, a thrust member secured to the outer periphery of one of said pistons extending into abutting engagement with the outer peripheral margin of the other of said pistons, a pressure head carried inside said thrust member in fluid-sealing relation therewith, an axially perforated stem having one end received in an aperture in the center of said pressure head in fluid tight relation, one of said pistons having a central opening through which is received said stem in fluid-sealing relation, a fluid pressure inlet port provided in the end wall of said cylinder, the end of said stem remote from said pressure head normally being yieldably urged into abutting relation with said end wall with the perforation in said stem registering with said port, resilient means for urging said pistons toward released position, a spherically shaped recess provided in the center of one of said other pistons on the side remote from said pressure head, and a closure for the end of said cylinder formed with a threaded central opening.

References Cited in the file of this patent

UNITED STATES PATENTS

| | | |
|---|---|---|
| 786,409 | Coon | Apr. 4, 1905 |
| 1,289,795 | Johnson | Dec. 31, 1918 |
| 1,548,559 | Simpson | Aug. 4, 1925 |
| 1,561,342 | Martin | Nov. 10, 1925 |
| 1,565,492 | Ohl | Dec. 15, 1925 |
| 1,725,720 | Pedersen | Aug. 20, 1929 |
| 1,968,667 | White | July 31, 1934 |
| 2,148,616 | Gruber | Feb. 28, 1939 |
| 2,393,524 | Fant | Jan. 22, 1946 |
| 2,395,223 | Ingres | Feb. 19, 1946 |
| 2,497,438 | Butler | Feb. 14, 1950 |
| 2,527,126 | Goepfrich et al. | Oct. 24, 1950 |

FOREIGN PATENTS

| | | |
|---|---|---|
| 453,170 | Great Britain | Sept. 7, 1936 |
| 466,804 | Great Britain | June 7, 1937 |
| 562,072 | Great Britain | June 16, 1944 |